J. R. TANNER & D. B. BANKS.
PIPE JOINT.
APPLICATION FILED MAY 11, 1909.
969,422.  Patented Sept. 6, 1910.
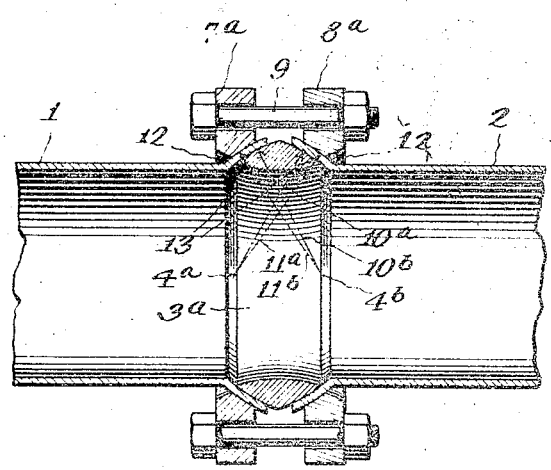
Witnesses.
Inventors.
J. R. Tanner
D. B. Banks,
by F. N. Barber,
their attorney

UNITED STATES PATENT OFFICE.

JULIUS R. TANNER, OF PITTSBURG, PENNSYLVANIA, AND DANIEL B. BANKS, OF BALTIMORE, MARYLAND.

PIPE-JOINT.

969,422.  Specification of Letters Patent.  Patented Sept. 6, 1910.

Application filed May 11, 1909. Serial No. 495,309.

*To all whom it may concern:*

Be it known that we, JULIUS R. TANNER and DANIEL B. BANKS, citizens of the United States, residing at Pittsburg, in the county of Allegheny and State of Pennsylvania, and city of Baltimore, State of Maryland, respectively, have invented or discovered new and useful Improvements in Pipe-Joints, of which the following is a specification.

Our invention relates to pipe joints and its object is to provide flexible pipe joints for high-pressure water mains.

It has been our aim to produce a joint of this character that will permit the pipe to be arranged at a convenient angle to each other without the possibility of drawing the pipe-ends at the joint and of allowing the pipe-ends to be forced out of the clamping devices therefor.

Referring to the accompanying drawing, the figure is a central longitudinal section through two pipes connected by our improved pipe-joint.

Referring to the drawing, 1 and 2 represent two pipes having their adjacent ends secured together by our improved joint.

$3^a$ is a ring, or annular support, having its internal diameter preferably equal to the internal diameter of the pipes 1 and 2. The periphery of the ring $3^a$ is composed of two spherical zones, shown as taken from the opposite halves of the same sphere, a central zone being omitted and the lateral zones being brought together at their greatest circles, which are obviously smaller than the greatest zone of the sphere or spheres from which they were taken. The right hand zone is described by the radius $10^a$ drawn from the center $4^a$, preferably at the left-hand end of the ring $3^a$; and the left-hand zone is described by the radius $10^b$ from the center $4^b$, preferably in the right-hand end of the ring $3^a$. The centers $4^a$ and $4^b$ lie in a line which includes the axial center of the ring $3^a$; that is the axis of the ring or its prolongation.

The adjacent ends of the pipes 1 and 2 are flared and their inner surfaces are curved to fit the zones on the ring $3^a$. The flared ends are of uniform thickness so that their outer surfaces will be described by the radii $11^a$ and $11^b$ drawn from the centers $4^a$ and $4^b$. The sizes of the parts are such that the ends of the pipe will not meet on the ring $3^a$ unless the pipes are turned at the maximum angle for which the joint has been designed. On the flaring ends of the pipes we place the two clamping rings $7^a$ and $8^a$, having their interior surfaces shaped to fit the outer surfaces of the said pipe-ends. Bolts 9 passed through the rings serve in an obvious manner to draw the rings toward each other, thereby causing them to wedge and clamp the flaring pipe-ends 5 and 6 tightly between the ring $3^a$ and the clamping rings.

We have provided clearance spaces 12 by omitting an annular portion, triangular in section, from the outer angle of the rings next to the pipe-ends. These clearance spaces permit the pipes to be flexed until the pipe walls engage the walls of the spaces 12.

It will be observed that the pipe ends assume a greater angle to the pipe bodies than they would if the zones were described from a point midway between the centers $4^a$ and $4^b$. Consequently, these centers may be located at any place which will make the angles of the pipe-ends with the pipe bodies greater than would be produced if the centers were placed so as to make the zones a single central zone of a sphere. It is clear that it will take more power to pull the pipe ends out of the clamping rings when zones having their greatest circle less than the great zone of the sphere from which it was taken are used than would be required if the zones included the greatest circle of a sphere. This is true because the greater the flare, which reaches its maximum when it is at right angles to the pipe-body, the more difficult it becomes to draw it down to or toward the diameter of the pipe-body. The force required to draw out the pipe ends from the clamping rings decreases as the flare of the pipe-ends decreases, reaching a minimum when the flare becomes zero.

By constructing the pipe-joint as described, the pipes may be flexed at various angles after merely loosening the bolts without any change in the fit of the pipe-ends on the rings $3^a$. No matter what the angle of the pipes may be we may secure a perfect fit of the parts, without disturbing the parallelism of the clamping rings, and consequently, without any bending of the bolts when the rings are tightly clamped in place. It is clear also that by omitting the central zone of the sphere, or by the use of two small zones of spheres, we save a great deal of material in the manufacture of our rings 3ª and also that the rings 7ª and 8ª may be brought closer together making a more compact structure

We claim—

In a universal pipe-joint, two pipes having their adjacent ends flared and of uniform thickness, a ring having its external surface constituting two spherical zones whose largest circles are smaller than the greatest circle of their spheres, said ring being seated within and fitting the said flared pipe-ends, a movable clamping ring surrounding the flared end of each pipe, and means for drawing the clamping rings toward each other.

Signed by the said JULIUS R. TANNER at Pittsburg this 26th day of April, 1909, and by the said DANIEL B. BANKS, at Baltimore, this 6" day of May, 1909.

JULIUS R. TANNER.
DANIEL B. BANKS.

Witnesses for Julius R. Tanner:
F. N. BARBER,
ANNA R. BEATTY.

Witnesses for Daniel B. Banks:
J. WALLACE BRYAN,
HUGH McCOY.